United States Patent
Jones et al.

(10) Patent No.: US 6,463,503 B1
(45) Date of Patent: Oct. 8, 2002

(54) METHOD AND SYSTEM FOR INCREASING CONCURRENCY DURING STAGING AND DESTAGING IN A LOG STRUCTURED ARRAY

(75) Inventors: Michael Reese Jones, Longmont, CO (US); Juan Li, San Jose, CA (US); Dung Kim Nguyen, San Jose, CA (US); Hai-Fang Yun, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/311,209

(22) Filed: May 12, 1999

(51) Int. Cl.$^7$ .............................................. G06F 12/14
(52) U.S. Cl. .................... 711/114; 711/111; 711/112; 711/113; 711/155; 711/157; 711/158; 707/203; 707/204; 707/206
(58) Field of Search .................... 711/111–114, 155, 711/157, 158, 167, 168; 707/206, 203, 204

(56) References Cited

U.S. PATENT DOCUMENTS

| | | | |
|---|---|---|---|
| 5,257,362 A | | 10/1993 | Menon ........................ 711/114 |
| 5,263,145 A | | 11/1993 | Brady et al. ................. 711/114 |
| 5,301,297 A | | 4/1994 | Menon et al. ............... 711/114 |
| 5,410,697 A | | 4/1995 | Baird et al. .................. 711/152 |
| 5,418,921 A | | 5/1995 | Cortney et al. ............. 711/114 |
| 5,459,853 A | | 10/1995 | Best et al. ................... 711/114 |
| 5,459,857 A | | 10/1995 | Ludlam et al. ................. 714/6 |
| 5,463,758 A | | 10/1995 | Ottesen ........................ 711/114 |
| 5,487,160 A | | 1/1996 | Bemis ........................... 711/114 |
| 5,488,701 A | | 1/1996 | Brady et al. ....................... 74/6 |
| 5,506,979 A | | 4/1996 | Menon ........................ 711/112 |
| 5,530,850 A | * | 6/1996 | Ford et al. ................... 707/206 |
| 5,666,114 A | * | 9/1997 | Brodie et al. ................. 341/50 |
| 5,671,390 A | * | 9/1997 | Brady et al. ................. 711/113 |
| 5,734,861 A | * | 3/1998 | Cohn et al. ................... 707/206 |
| 5,799,324 A | * | 8/1998 | McNutt et al. ................. 360/48 |
| 5,802,344 A | * | 9/1998 | Menon et al. ............... 711/165 |
| 5,933,840 A | * | 8/1999 | Menon et al. ............... 707/205 |
| 6,052,799 A | * | 4/2000 | Li et al. ....................... 711/114 |
| 6,256,705 B1 | * | 7/2001 | Li et al. ....................... 711/112 |
| 6,336,164 B1 | * | 1/2002 | Gerdt et al. ................. 707/206 |

OTHER PUBLICATIONS

"Raid with Automatic Defect Detection and Correction Functions," *IBM Technical Disclosure Bulletin*, vol. 39, No. 02, Feb. 1996.

"Parallel Command Processing for Small Computer System Interface Mirror Drive," *IBM Technical Disclosure Bulletin*, vol. 38, No. 02, Feb. 1995.

"Pacing a Redundant Arrays Independent Disks Sparing Operation," *IBM Technical Disclosure Bulletin*, vol. 38, No. 10, Oct. 1995.

"Non–Disruptive Global Status Track Expansion," *IBM Technical Disclosure Bulletin*, vol. 37, No. 10, Oct. 1994.

"Direct Memory Access Controller for DASD Array Controller," *IBM Technical Disclosure Bulletin*, vol. 37, No. 12, Dec. 1994.

* cited by examiner

*Primary Examiner*—Than Nguyen
(74) *Attorney, Agent, or Firm*—Sawyer Law Group LLP

(57) ABSTRACT

Aspects for increasing concurrency during staging and destaging of a log structured array (LSA) are described. In an exemplary method aspect, the method includes determining a process type making a request for access to a locking mechanism associated with an LSA directory entry for a logical track, and determining a lock status for the locking mechanism. Access to the locking mechanism is then provided according to the determined process type and lock status. Further, a destaging process is allowed to obtain an available locking mechanism in a read-write mode, a staging process is allowed to obtain an available locking mechanism in a read-only mode, and a garbage collection process is allowed to obtain an available locking mechanism initially in a read-only mode and subsequently in a read-write mode, wherein increased concurrency results during the staging and destaging processes.

27 Claims, 3 Drawing Sheets

Cache Oriented Buffered DASD Array

METHOD AND SYSTEM FOR INCREASING CONCURRENCY DURING STAGING AND DESTAGING IN A LOG STRUCTURED ARRAY

FIELD OF THE INVENTION

The present invention relates to log structured arrays for storage subsystems, and more particularly to increasing concurrency during staging and destaging in a log structured array.

BACKGROUND OF THE INVENTION

In storage subsystems, a redundant array of inexpensive disks, RAID, is one solution to I/O (input/output) bottleneck problems. RAID typically increases disk bandwidth through parallelism for accessing data and provides high data availability through redundancy. One problem associated with some levels of RAID is the write penalty; a write operation actually requires two disk reads (of old data and parity) and two disk writes (of updated data and the newly calculated parity). Log Structured Array (LSA) writes all customer data to disk sequentially in a log-like structure and enables RAID to support data compression. The amount of compression achieved is dependent on the actual data values. After a piece of data is modified, it may not compress to the same number of bytes and thus will not fit into the space originally allocated to it. This problem is encountered in any storage system that assigns a piece of data to a disk fixed location; LSA avoids this problem, since updated data is written to end of the log structure.

Through LSA, a logical track, LT, which is the typical unit accessed by I/O programs, is allowed to be updated to a different location on disk. Since the physical address of a logical track changes over time, a directory, called LSA directory, is necessary to keep track of the current LT's physical address on the array. Each directory entry also records the logical track's current length, as this may vary with compression.

The log structured array consists of N+P+S physical disk drives, where N is the number of HDDs' (hard disk drive) worth of physical space available for customer data, P is the number of HDDs' worth of physical space for parity data, and S is the number of HDDs' worth of physical space for spare drives. Each HDD is divided into large consecutive areas called segment columns. Typically, a segment column is as large as a logical cylinder. Corresponding segment columns from the N+P+S HDDs constitute a segment. The array has as many segments as there are segment columns on a HDD disk in the array. An example of the layout for such a system is shown in FIG. 1. In a RAID-5 configuration, one of the segment columns of a segment contains the parity of the remaining data segment columns of the segment.

Referring to FIG. 1, the storage for the partition 52 is arranged as segments 56, where each segment has N data segment columns 58 and one parity segment column 59. The logical tracks 60 are stored within segment columns. A segment directory 62 contains information on each of the logical tracks in the segment which is used during garbage collection and recovery procedures. The segment directory 62 is stored in a small number of sectors out of a segment's total disk space. As shown, the entire segment directory resides in one same segment column in each of the segments. Alternatively, the segment directory can be spread among the devices. In a RAID-5 system, parity is distributed among the devices as shown.

A segment column is defined as an arbitrary number of contiguous physical tracks as described above. Typically it is desirable to define a segment column to be the same size as a logical cylinder. The collection of disk recording areas comprising corresponding segment columns from each of the HDDs forms what is called a segment.

LSA segments are categorized as one of the following types: free, which refers to a segment that contains no valid data; open, which refers to a segment that is available to hold LTs being destaged; closed, which refers to a segment containing some valid data, but to which no destaged data can be further assigned; and being garbage collected, GC, which refers to a closed segment that is currently being garbage collected, as discussed hereinbelow. A closed segment consists of 'live' LTs and 'holes'. The former are LTs that were assigned to the segment during the segment's open phase and still reside in the segment. The latter is space vacated by LTs that were assigned to the segment but have subsequently been updated and assigned to different open segments. A closed segment's occupancy is the sum of the lengths of the segment's live LT.

A destage operation allows the LTs in a logical cylinder to be destaged together from a cache within the storage subsystem to the storage device to enhance the seek affinity of sequential accesses. A logical cylinder is typically called a neighborhood, and a group of logical tracks in a logical cylinder destaged together is called a neighborhood in destage (NID) or neighborhood destage request. Destaging a neighborhood essentially involves the following steps:

1. The neighborhood in destage is assigned to an open segment.

2. An open segment remains available to accept other neighborhoods in destage until it is deemed full enough to close in accordance with a desired algorithm.

3. The data and parity of the segment is written to disk before the segment is considered closed.

4. Each LT in the open segment has an entry in the segment directory that describe the LT's location in the segment. The segment directory is written on disk, as part of the segment.

An LT in a closed segment may be updated and destaged again, at which time it is assigned to another open segment. This causes the previous copy of the LT to become obsolete, thus forming a 'hole' in the closed segment. Garbage collection (GC) is the process of reclaiming 'holes' in closed segments. GC is started when the number of free segments falls below a certain threshold.

The process of garbage collecting a segment involves reading the segment's directory from disk, then scanning each segment directory entry and comparing the LT's address as indicated by the segment directory entry with the address as indicated by the LSA directory entry. If the two entries match, then the LT still resides in the segment and is considered 'live'. All the live LTs are then read from disk into memory and sorted by neighborhood. These NIDs then proceed to be destaged in the same manner as described above. These NIDs are assigned to open segments; when such open segments close successfully, the NIDs are garbage collected, thus decreasing the occupancy of the segments in which the NIDs previously resided. When a segment's occupancy declines to zero, either as a result of garbage collection or as a result of movement of tracks from normal destage activity, the segment becomes free.

The LSA directory keeps track of LTs' length and physical address in the disk array in terms of segment number, segment column number, and offset within the segment column. An LT's LSA directory entry is accessed whenever the LT is involved in any one of the three major processes: staging of data from disk, destaging of data to disk, and garbage collection. When an LT is staged, its LSA directory entry is read to determine the LT's physical location in the array. When an LT is destaged, its physical address changes and its LSA directory entry must be updated to indicate the new location. Likewise, when the LT is garbage collected, the track changes physical location, and the LSA directory entry must be updated.

Conflicts in access of the LSA directory entry arise when a logical track is involved in the following combination of concurrent operations: destage and garbage collection, or stage and garbage collection. Design of the interface between the disk control unit's caching component and its array component prohibits concurrent stage and destage of the same LT. Similarly, an LT cannot be destaged a second time before a first destage operation completes; and an LT cannot be staged a second time before a first stage operation completes. In the other cases, the LSA directory entry locking mechanism provided by the LSA subcomponent must handle the concurrent accesses.

One straightforward approach for handling concurrent accesses is to simply serialize the operations. That is, the destage operation is not allowed to begin if the LT is in a segment currently being garbage collected; a segment is not allowed to begin garbage collection if it contains an LT that is being destaged; a segment is not allowed to be garbage collected if it contains an LT currently being staged; and an LT is not allowed to be staged if it resides in a segment that is undergoing garbage collection. Unfortunately, such a solution sacrifices efficiency and performance. If an LT is currently being garbage collected when a destage request for the LT arrives, it is inefficient to force the destage operation to wait while the garbage collection process moves the LT to a different location, as the destage operation will accomplish the same result. It also degrades the destage performance a great deal, since the destage request, normally at higher priority than garbage collection, has to wait for the relatively time-consuming garbage collection process to finish before the destage can proceed. Similarly, if an LT is currently being garbage collected when a stage request for the LT arrives, then performance of the stage operation would be unacceptably slow if it were forced to wait for the garbage collection process to complete.

Accordingly, a need exists for increased concurrency during staging and destaging in a log structured array. The present invention addresses such a need.

SUMMARY OF THE INVENTION

The present invention provides aspects for increasing concurrency during staging and destaging of a log structured array (LSA). In an exemplary method aspect, the method includes determining a process type making a request for access to a locking mechanism associated with an LSA directory entry for a logical track, and determining a lock status for the locking mechanism. Access to the locking mechanism is then provided according to the determined process type and lock status. Further, a destaging process is allowed to obtain an available locking mechanism in a read-write mode, a staging process is allowed to obtain an available locking mechanism in a read-only mode, and a garbage collection process is allowed to obtain an available locking mechanism initially in a read-only mode and subsequently in a read-write mode, wherein increased concurrency results during the staging and destaging processes.

Through the present invention, conflicting processes have a greater degree of concurrency than that under serialization of processes. Additionally, utilization of a specialized shared lock in each LT's LSA directory entry efficiently directs which process type(s) operate on an LT. These and other advantages of the aspects of the present invention will be more fully understood in conjunction with the following detailed description and accompanying drawings.

DETAILED DESCRIPTION OF THE INVENTION

The present invention relates to increasing concurrency during staging and destaging in a log structured array. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
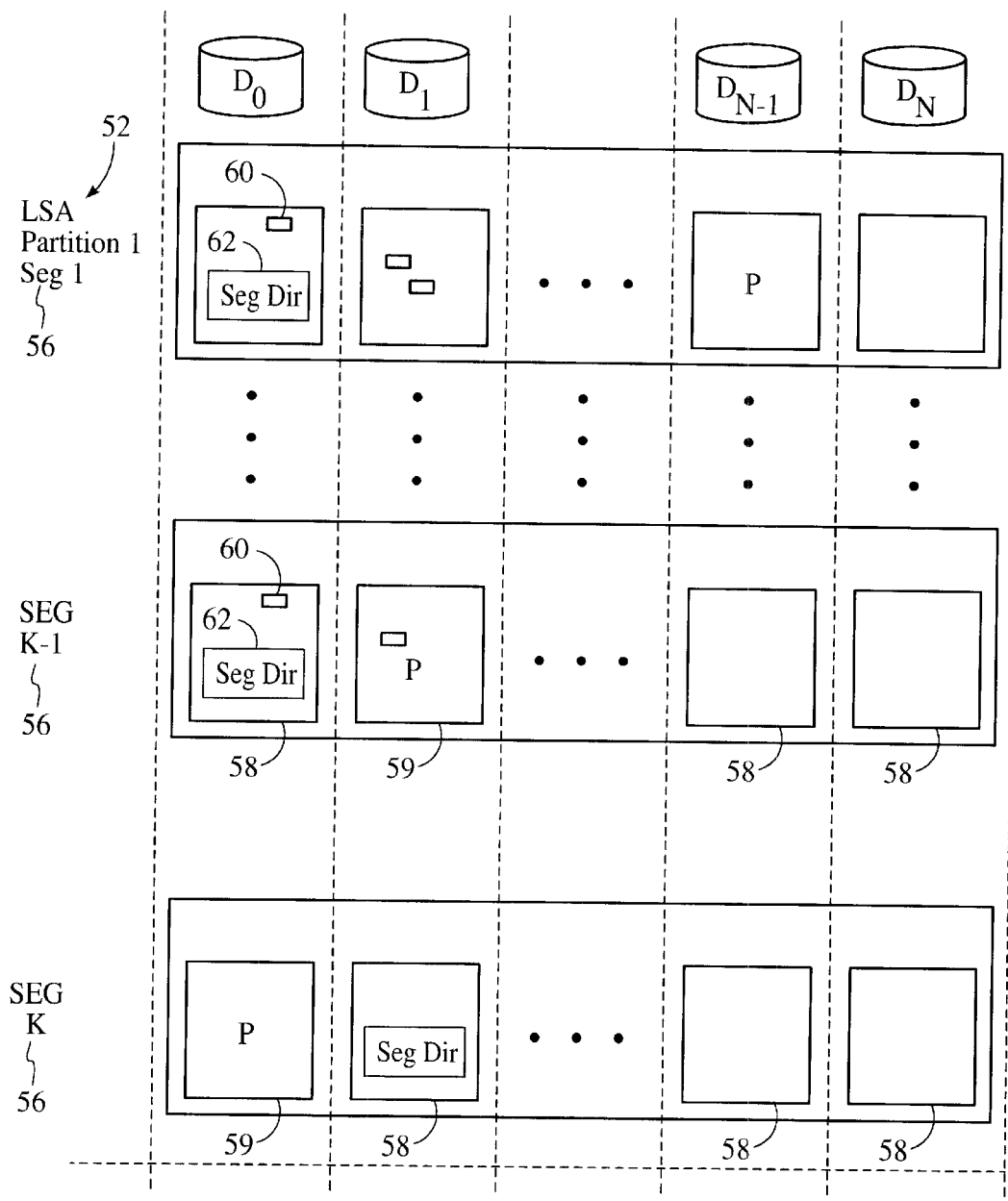
FIG. 1 illustrates an example of an LSA layout.
Figure 2:
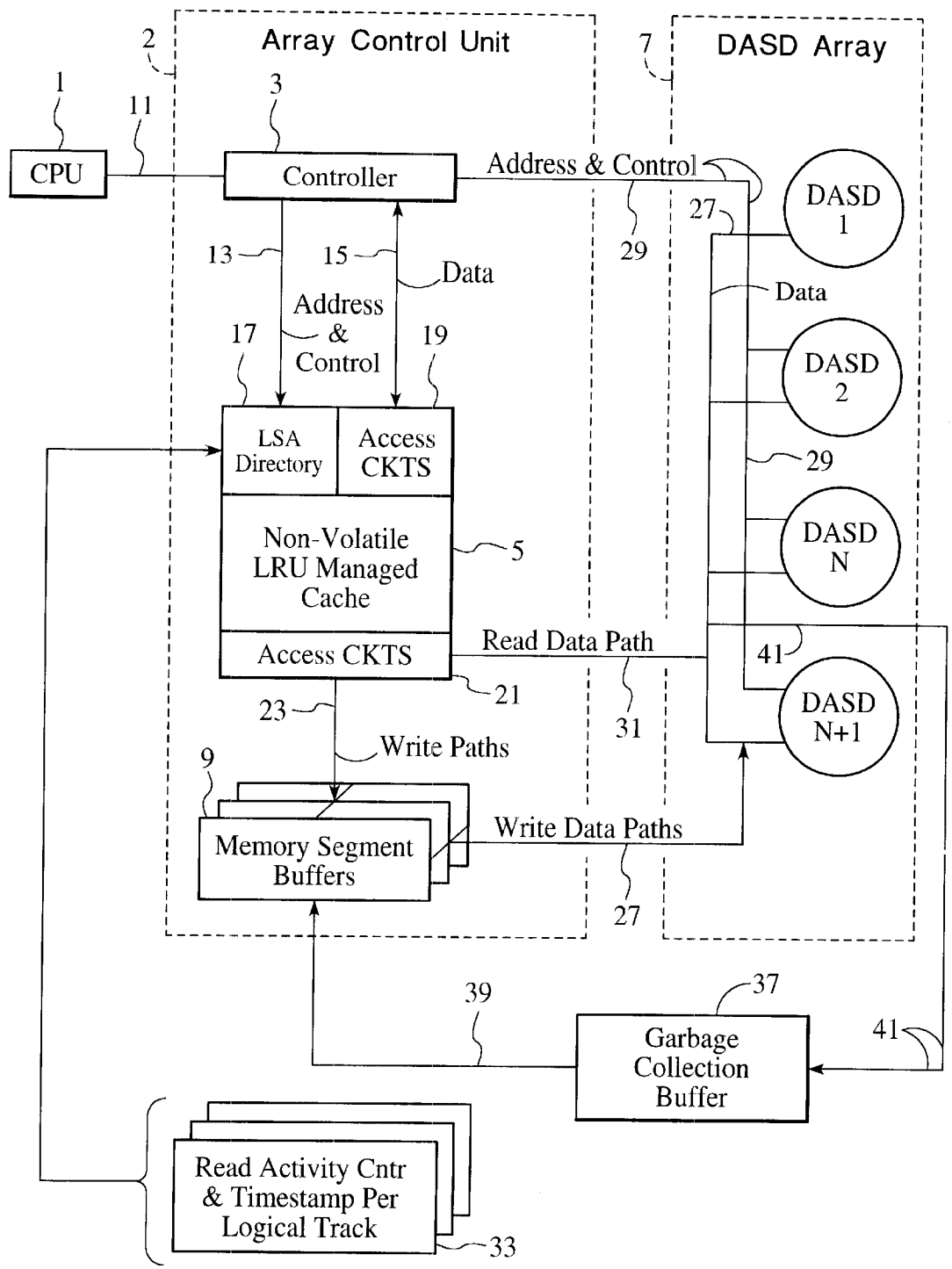
FIGS. 2 illustrates a cache oriented buffered DASD array system in accordance with the present invention.

Referring now to FIG. 2, there is shown a system including a host processor 1, and an external store. The external store is formed from an array 7 of groups of N+1 DASDs, and an array control unit 2 coupling the processor 1 to the array 7. Processor 1 preferably comprises one or more processors used to execute application and system code; memory to hold application code, system code, and data; and means responsive to read and write calls from executing applications for accessing information not otherwise in memory from the external store through the system code (otherwise termed an operating system such as MVS, AIX, CICS, etc.)

Typically, as described in Luiz et al., U.S. Pat. No. 4,207,609, "Method and Means for Path Independent Device Reservation and Reconnection in a Multi-CPU and Shared Device Access System", issued Jun. 10, 1980, there is shown an architecture for establishing an access path to data by which a processor host or CPU obtains variable or fixed length records from an attached DASD storage subsystem.

Under this architecture, the CPU creates a dedicated virtual processor for accessing and transferring data streams over demand/response interfaces to attached subsystems using chains of special purpose I/O instructions termed "channel command words" or CCWs. The CCWs are stored in a portion of CPU main memory in support of fast calls. When an application program executes a read or write requiring access to external storage (usually attached DASD storage), then, for example, a CPU S/370 MVS operating system initiates such a reference with a START I/O command. This command causes the CPU to suspend its multi-processing state, transfer to the CCW chain, and re-establish its prior state after CCW chain completion.

Referring again to FIG. 2, processor 1 sends an appropriate CCW chain to controller 3 over path 11. Controller 3

'interprets' each of the CCW's and responsively applies counterpart control and address signals over path 13 to LSA directory 17 to ascertain location of data on DASD array 7. Data is transferred between host processor 1 and array 7 in the read direction over a path including read data path 31, access circuits 21, cache 5, access circuits 19, path 15, and controller 3. Data is transferred in the write direction over a path including controller 3, access circuits 19, cache 5, access circuits 21, accumulating memory segment buffer 9 and write path 27.

Controller 3 comprises one or more microprocessors with sufficient associated local memory for storing software for interpreting the CCWs and managing the cache 5 and the DASD array 7 according to the LSA storage model of this invention. DASD array 7 may be managed by controller 3 as a RAID 3 or RAID 5 array, as is well understood by those skilled in the art.

Array control unit 2 includes a large, non-volatile (NV) cache memory 5 and memory segment buffers 9 formed from a plurality of segment column sized buffers. The NV cache 5 holds both updated logical tracks received from the host CPU 1 and clean logical tracks read from DASD array 7. Cache 5 is managed in the traditional LRU fashion. That is, cache 5 contains clean LTs organized in one LRU list and modified (dirty) LTs organized in another LRU list. The fraction of cache occupied by modified LTs is monitored by the controller 3. When this fraction exceeds some threshold, some number of modified LTs are assigned to one of the memory segment buffers 9. After a segment's worth of tracks are stored in buffer 9, they are written into contiguous sectors on the devices in the DASD array 7. When cache memory is needed to hold new logical tracks read from DASD, or new logical tracks received from the host system, LRU clean LTs can be overwritten in cache 5.

The buffering aspect of cache 5 permits delay in writing modified logical tracks to one of the memory segment buffers 9 and then to the DASD array 7. This delay can be advantageously employed to minimize any loss of seek affinity. If other writes to adjacent LTs are received into the cache 5 from the system (controller 3) before the first LT is selected for pushing out from cache 5 to one of the memory segment buffers 9, then all logically adjacent modified tracks can be pushed out at the same time into the same memory segment column of the memory segment buffer. Thus, if adjacent tracks are modified within some window of time proportional to the size of cache 5, they will likely be placed contiguously on DASD, and no seek affinity will be lost.

The cache 5 is operated according to the following constraints:

(1) When the fraction of cache space occupied by modified tracks exceeds a threshold, a modified LRU LT and logically adjacent LTs are pushed from the cache 5 to one of the memory segment buffers 9, preferably to a single memory segment-column. That is, if there are at least c (e.g., c=2) adjacent clean LTs in cache 5 at this time, then the adjacent clean LT should likewise be pushed out to the memory buffer of the same segment 9 as well.

(2) Shortly before the space containing an LRU clean LT is scheduled for reuse, ascertain whether at least m (e.g., m=1) logically adjacent clean LTs are in cache 5 and are not currently stored physically contiguously on DASD disk. If such LTs are found, push the LRU clean LT and all adjacent clean and modified LTs to one of the memory segment buffers 9, preferably in the same memory segment-column.

The term "logically adjacent tracks" refers to LTs which reside in the same "neighborhood". For this purpose, a "neighborhood" is defined as an ordered set of logical tracks. It follows that "adjacent neighborhoods" are those in which the first k logical tracks are in neighborhood 1, the second k logical tracks are in neighborhood 2, and so on. Thus, for example, a neighborhood consisting of k=15 logical tracks can form a logical cylinder on a typical logical DASD storage device.

LTs being garbaged collected are read and placed in a garbage collection buffer 37 over a path from array 7 and line 41. The collected LTs are sorted by track number and accumulated into neighborhoods, which are then destaged. Like NIDs originating from cache, each GC NID is placed entirely in a single segment column of the segment, if possible. When a segment fills buffer 9, it is written to DASD array 7 over write data path 27.

A locking mechanism controlled via controller 3 of array controller 2 in accordance with the present invention helps to ensure data concurrency during garbage collection, staging, and destaging operation in a log-structured array storage subsystem. In general, the locking mechanism allows a stage process to obtain the lock in read-only mode; allows a destage process to obtain the lock in read-write mode; and allows a GC process to obtain the lock in read-only mode initially, then read-write mode, as explained hereinbelow. Further, the lock can be shared if held in read-only mode. In addition, when a lock is released, a next process waiting gets access.

Figure 3:
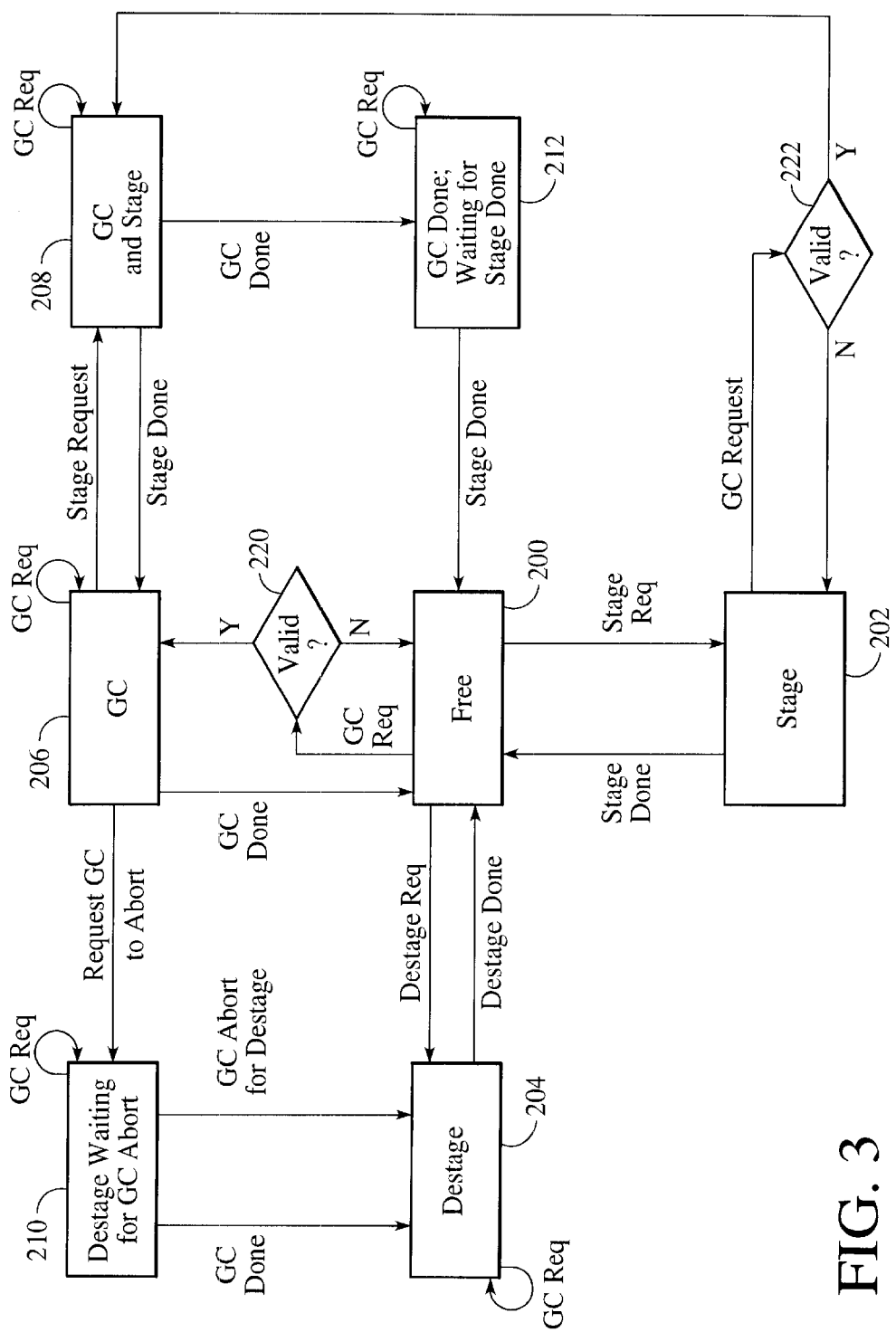
FIG. 3 illustrates a state diagram in accordance with the present invention.

The locking mechanism operates according to the state diagram in FIG. 3. The state machine is initially in state 200. From this state, the three type of lock requests can be received. A LT lock request from a staging process results in granting of the lock in read-only mode and causes the state machine to transition to state 202. A LT lock request from a destaging process results in granting of the lock in read-write mode and causes the state machine to transition to state 204. A LT lock request from a GC process causes a test 220 to determine whether the LT is "live" by comparing the LT's address indicated in the segment directory entry to that indicated in the LSA directory entry. If the LT is considered "live," the GC process is granted the lock in read-only mode on transition to state 206.

Beyond the above simple cases, the following 4 scenarios illustrates the operation of the state machine for concurrent lock requests. Note that the conflicts in lock requests always involve the GC process.

I. LT is to be garbage collected while a stage operation on the LT is in progress.

II. LT is to be staged while it is currently being garbage collected.

III. LT is to be garbage collected while a destage operation on the LT is in progress.

IV. LT is to be destaged while it is currently being garbage collected

Case I.—LT is to Be Garbage Collected While a Stage Operation on the LT is in Progress The garbage collection process, when determining which LTs in a segment are valid, compares the segment directory entries to the corresponding LSA directory entries (222). The valid LTs are to be assigned to another segment and then written to disks; thus the process must obtain a lock for each valid LT's directory entry.

Since the LT lock is being held by a stage operation, the GC process is allowed to share the lock in read-only mode with the stage process (208). The GC process obtains the lock and proceeds to garbage collect the LT. At the end of the GC process, when the LT's physical address must be updated in its LSA directory entry, the lock must be converted from read-only to read-write.

If the stage process has already released the lock (i.e. lock state has transitioned to 206), then GC process obtains the lock in read-write mode, updates the LSA directory entry, then releases the lock. These three steps must be executed atomically on the transition from 206 to 200. Therefore, another stage operation's lock request that arrives between the time the lock becomes read-write and before it is released, is not serviced until after the GC process releases the lock. That amount of time during which the stage operation is delayed does not significantly impact the performance of the operation.

If the stage operation is not finished by the time the GC process needs exclusive access to the lock (still in state 206), then the GC process requests to obtain the lock in read-write mode and waits for the stage operation to complete in state 212. When the staging operations finishes the following steps occur atomically on transition from 212 to 200:

a. the lock is released by the stage process and granted exclusively to the GC process b. GC process updates the LSA directory entry c. GC process releases the lock Case II.—LT is to Be Staged While it is Currently Being Garbage Collected The GC process is already holding a LT's lock in read-only mode (state 206) when a stage operation requests the same lock. The lock is granted to the latter in shared read-only mode on transition to state 208. Both processes proceed concurrently, until the end of the GC process, when the LT's new address must be updated in the LSA directory. The same rules as in case I apply here for GC process's conversion of the lock from read-only. Note that the GC process initially obtains a lock in read-only mode because it can share the LT lock with any future stage operations.

Case III.—LT is to Be Garbage Collected While a Destage Operation on the LT is in Progress The lock is currently held by a destage process (state 204). A LT lock request from a GC process will be denied and the LT will not be garbage collected, as the destage operation will achieve the same result by moving the LT to another segment. If the destage operation does not complete successfully, then the LT remains where it is. The segment being garbage collected does not become free, as it still contains valid data.

Case IV.—LT is to Be Destaged While it is Currently Being Garbage Collected

When a new destage operation starts, it requests the lock for each LT being destaged. The destage operation always requests a lock in read-write mode because it will not hold the lock concurrently with any other owner. If a garbage collection process holds the desired lock (state 206), it is notified that the destage operation requests the lock on transition to state 210.

If the GC process has passed a certain point in its thread of execution, the destage operation must wait until the former releases the lock; the lock state remains 210. At the end of the GC process, when the LT's physical address must be updated in its lSA directory entry, the lock ownership is converted from read-only to read-write mode. The GC process updates the directory entry and then releases the lock. These three steps are executed atomically on transition to state 204.

If the GC process has not passed the relinquish point, it can release the lock to the destage process; the state machine transitions to state 204 via 240. The LT is not garbage collected as the destage operation will achieve the same result by moving the LT to antoher segment. If the destage operation does not complete successfully, then the LT remains where it is. The segment being garbage collected does not become free, as it still contains valid data.

Thus, there are seven possible states of a lock's ownership by the three processes of garbage collection, staging, and destaging as shown on the state diagram of FIG. 3: free 200; stage 202; destage 204; GC 206; shared by GC and stage 208; GC, destage waiting 210; and shared by GC and stage, GC waiting for exclusive access 212. With seven states, the locking mechanism of the present invention is readily implemented with three bits per LSA directory entry, as is well appreciated by those skilled in the art.

Through the present invention, a greater degree of concurrency among conflicting processes is allowed than that allowed under serialization. The solution efficiently utilizes a specialized shared lock in each LT's LSA directory entry, so that whenever the stage, destage, or garbage collection process wishes to operate on an LT, the process must obtain the lock for that LT.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claim.

What is claimed is:

1. A method for increasing concurrency during staging and destaging of a log structured array (LSA), the method comprising:

determining a process type making a request for access to a locking mechanism associated with an LSA directory entry for a logical track;

determining a lock status for the locking mechanism; and providing access to the locking mechanism according to the determined process type and lock status.

2. The method of claim 1 wherein when the process type comprises a garbage collection process and the locking mechanism is available, the garbage collection process obtains the locking mechanism in a read-only mode.

3. The method of claim 2 wherein when the process type comprises a garbage collection process and the locking mechanism is not available, the method further comprises determining whether the locking mechanism is held by a staging process.

4. The method of claim 3 wherein when the locking mechanism is held by the staging process, the locking mechanism is shared in read-only mode.

5. The method of claim 4 further comprising performing the garbage collection and the staging process substantially concurrently.

6. The method of claim 4 wherein when the garbage collection process is to update the LSA directory entry, determining whether a read-write mode of the locking mechanism is available.

7. The method of claim 6 wherein once the read-write mode is available, the garbage collection process obtains the locking mechanism in read-write mode, updates the LSA directory entry for the logical track, and releases the locking mechanism atomically.

8. The method of claim 3 wherein when the locking mechanism is not held by the staging process, access to the locking mechanism is denied.

9. The method of claim 1 wherein when the process type comprises a staging process and the locking mechanism is not held by a garbage collection process, the staging process obtains the lock.

10. The method of claim 9 wherein when the process type comprises a staging process and the lock is held by a garbage collection process, the locking mechanism is shared by the staging process and the garbage collection process in a read-only mode.

11. The method of claim 1 wherein when the process type comprises a destaging process, the method further comprises determining whether the locking mechanism is held by a garbage collection process.

12. The method of claim 11 wherein when the locking mechanism is not held by a garbage collection process, the destaging process obtains the locking mechanism in a read-write mode.

13. The method of claim 11 wherein when the locking mechanism is held by a garbage collection process, the method further comprises notifying the garbage collection process of the request.

14. The method of claim 13 further comprising determining a current point of execution in the garbage collection process, wherein when the current point is beyond a predetermined point, the destaging process waits for release of the locking mechanism by the garbage collection process.

15. The method of claim 14 wherein when the current point is not beyond a predetermined point, the garbage collection process relinquishes the locking mechanism to the destaging process.

16. A system for increasing concurrency during staging and destaging of a log structured array (LSA), the system comprising:

a processor;

an array control unit coupled to the processor, the array control unit including a cache and a controller for determining a process type making a request for access to a locking mechanism associated with an LSA directory entry for a logical track, determining a lock status for the locking mechanism, and providing access to the locking mechanism according to the determined process type and lock status; and a storage subsystem coupled to the array control unit for storing data from the cache.

17. The system of claim 16 wherein the array control unit further allows a destaging process to obtain an available locking mechanism in a read-write mode.

18. The system of claim 16 wherein the array control unit allows a staging process to obtain an available locking mechanism in a read-only mode.

19. The system of claim 16 wherein the array control unit allows a garbage collection process to obtain an available locking mechanism initially in a read-only mode and subsequently in a read-write mode.

20. The system of claim 16 wherein the array control unit further allows sharing of the locking mechanism in a read-only mode by a garbage collection process and a staging process.

21. The system of claim 16 wherein the array control unit further ends a garbage collection process for a logical track when the locking mechanism is held by a destaging process at the time of a request for the lock by the garbage collection process.

22. The system of claim 16 wherein the array control unit further releases the locking mechanism by a garbage collection process when a destaging process makes a request for the locking mechanism and the garbage collection process has not passed a predetermined point of execution.

23. A method for increasing concurrency during staging and destaging in a log structured array (LSA), the method comprising:

determining availability of a locking mechanism associated with LSA directory entries for logical tracks;

allowing a destaging process to obtain an available locking mechanism in a read-write mode;

allowing a staging process to obtain an available locking mechanism in a read-only mode; and allowing a garbage collection process to obtain an available locking mechanism initially in a read-only mode and subsequently in a read-write mode, wherein increased concurrency with the garbage collection process results during the staging and destaging processes.

24. The method of claim 23 further comprising allowing sharing of the locking mechanism in a read-only mode by the garbage collection process and the staging process.

25. The method of claim 23 further comprising ending the garbage collection process for a logical track when the locking mechanism is held by the destaging process at the time of a request for the lock by the garbage collection process.

26. The method of claim 23 further comprising releasing the locking mechanism by the garbage collection process when the destaging process makes a request for the locking mechanism and the garbage collection process has not passed a predetermined point of execution.

27. The method of claim 23 further comprising notifying a waiting process when the locking mechanism becomes available upon release of the locking mechanism by a holding process.

* * * * *